Oct. 22, 1963 D. JOHNSTON 3,107,638
MANUALLY OPERABLE IMPLEMENT FOR INJECTING ANHYDROUS
AMMONIA AND OTHER LIQUID FERTILIZERS INTO THE SOIL
Filed May 31, 1960 6 Sheets-Sheet 1
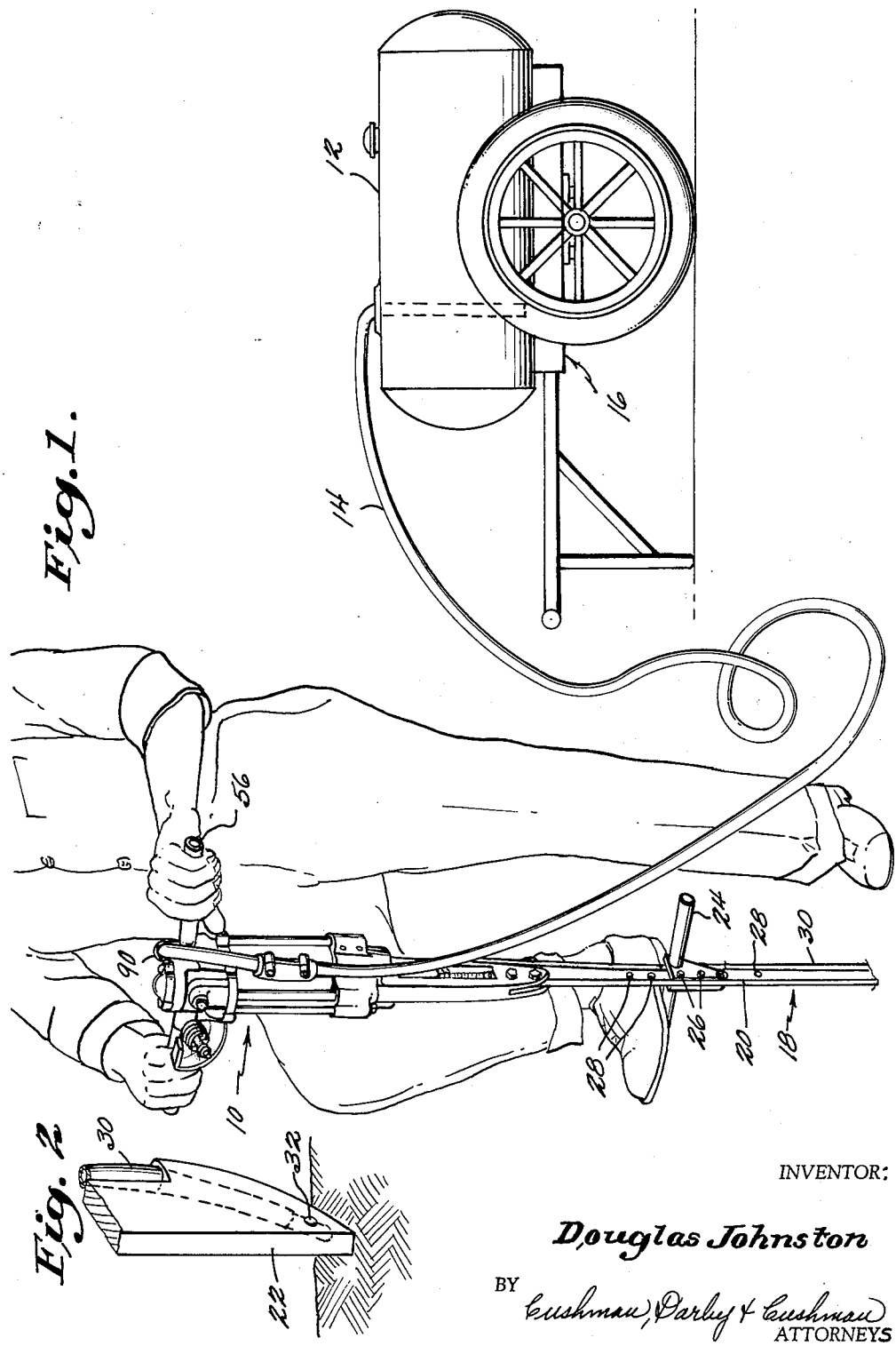
INVENTOR:
Douglas Johnston
BY Cushman, Darby & Cushman
ATTORNEYS

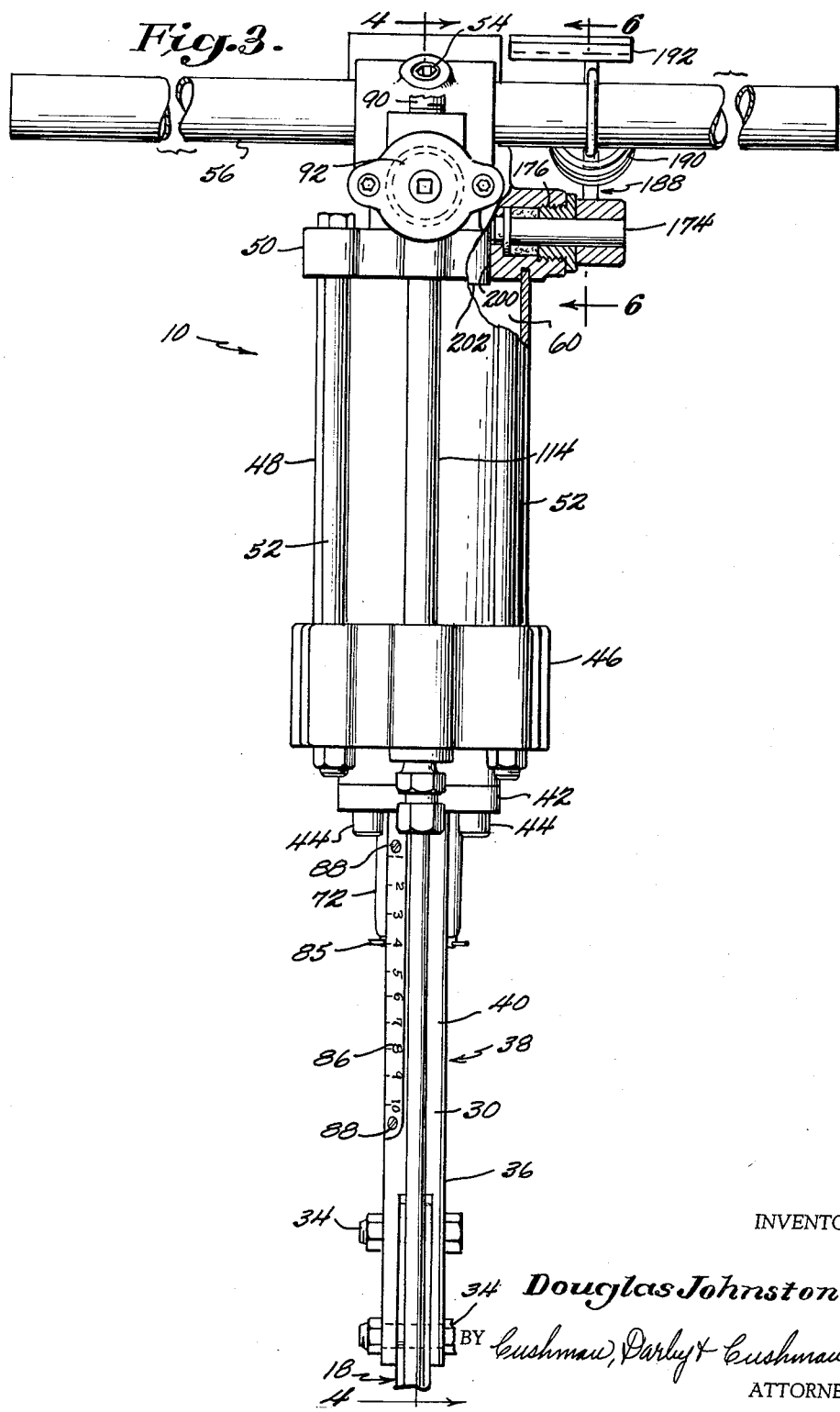

INVENTOR:
Douglas Johnston
BY Cushman, Darby & Cushman
ATTORNEYS

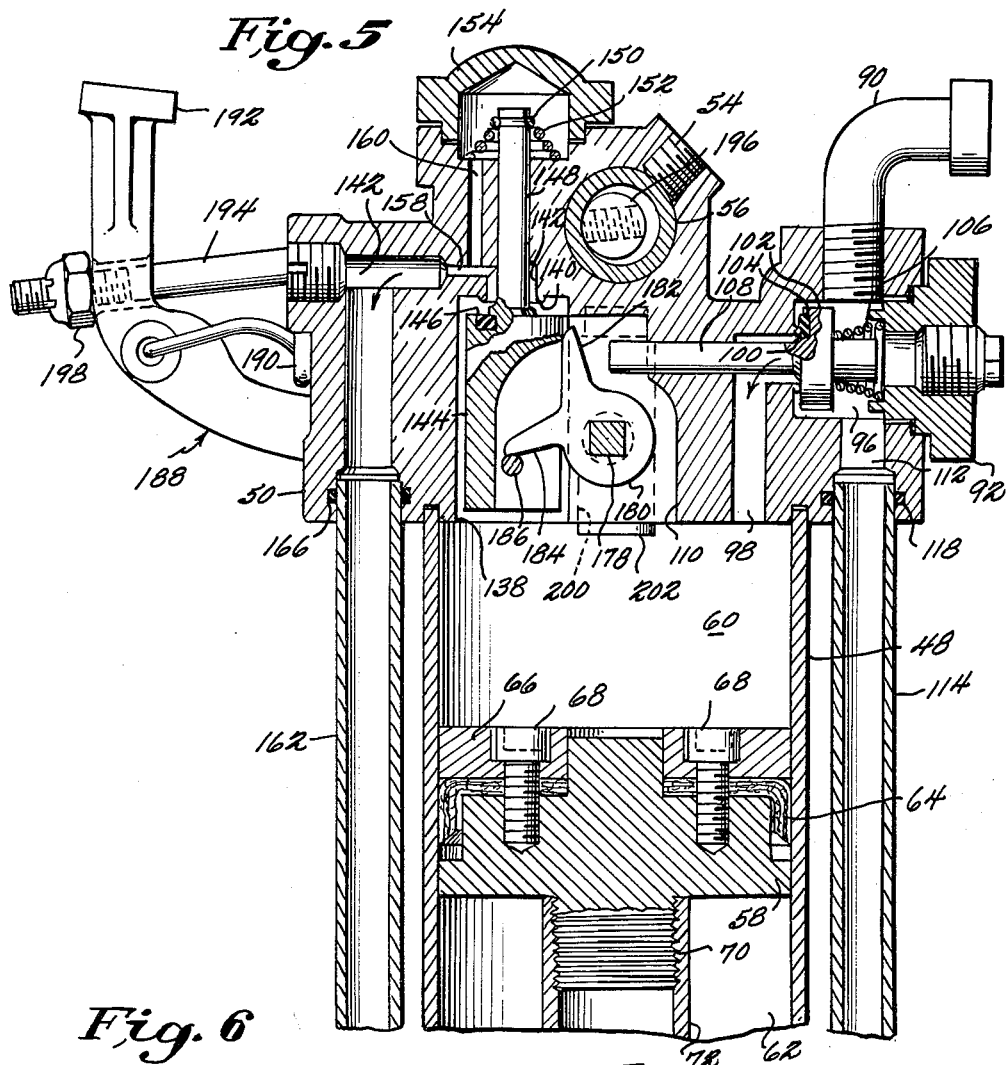
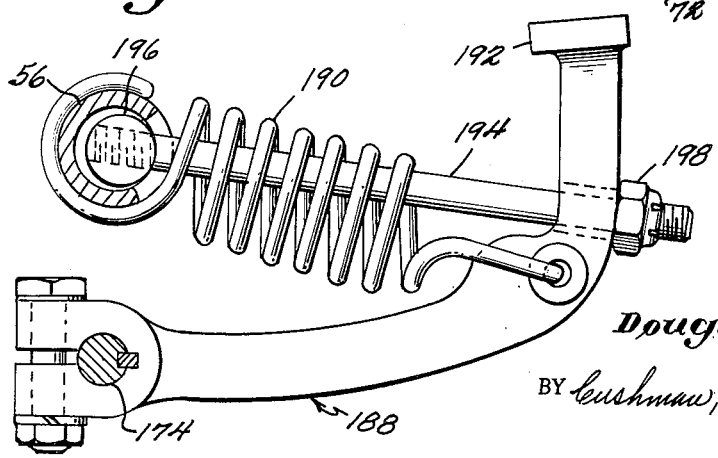

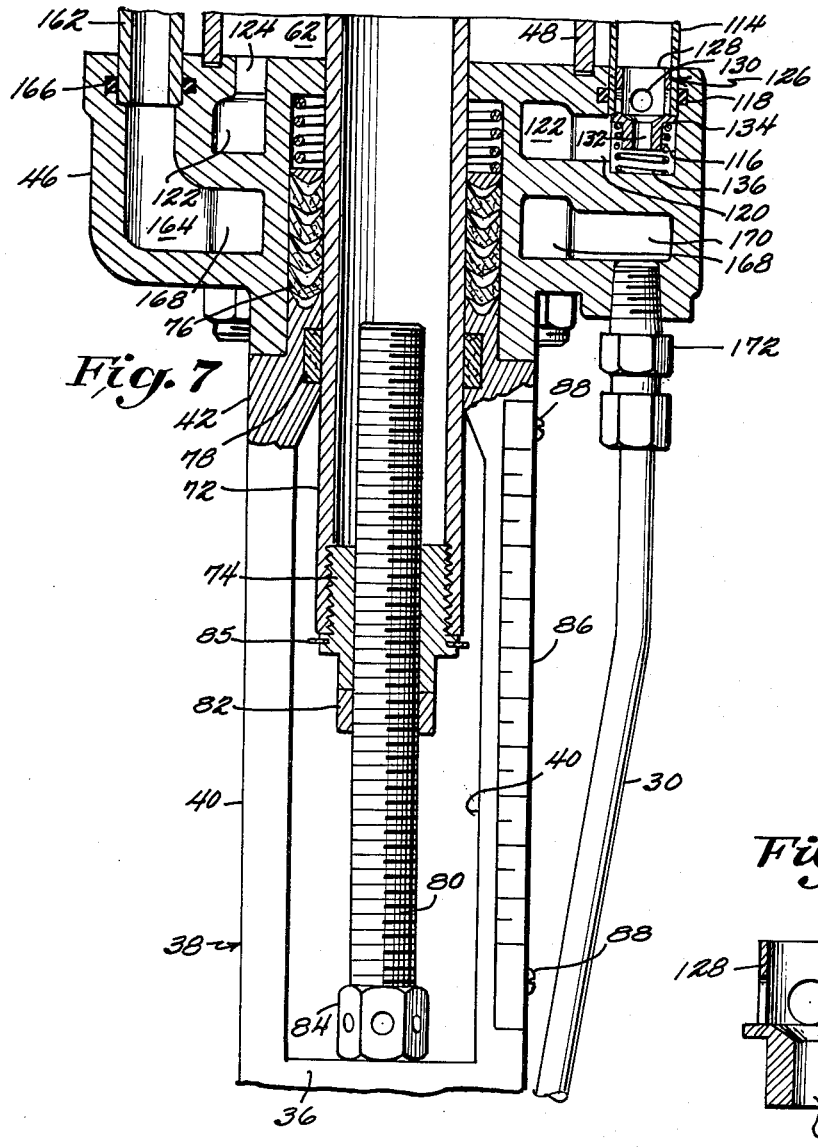

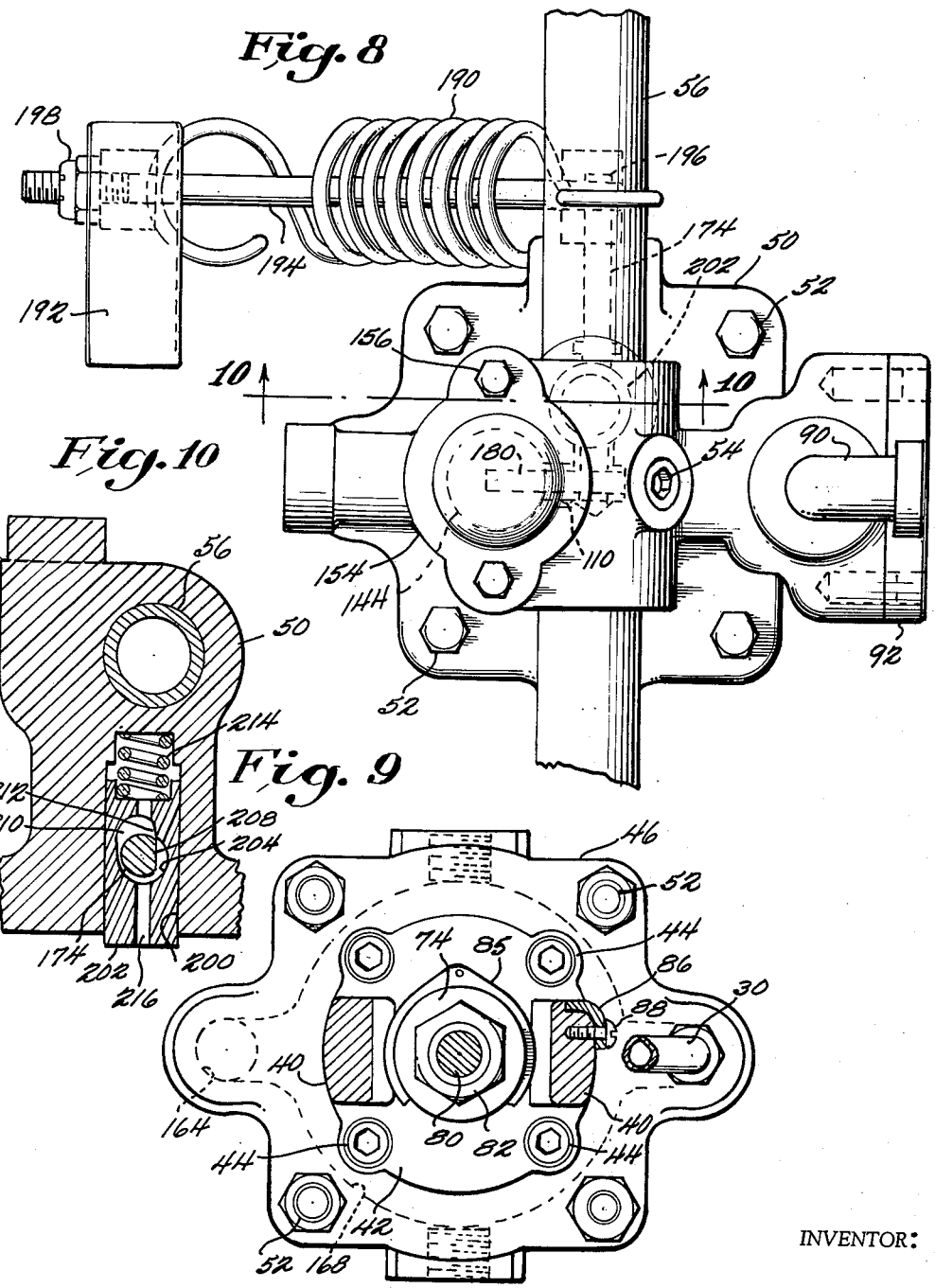

United States Patent Office 3,107,638
Patented Oct. 22, 1963

3,107,638
MANUALLY OPERABLE IMPLEMENT FOR INJECTING ANHYDROUS AMMONIA AND OTHER LIQUID FERTILIZERS INTO THE SOIL
Douglas Johnston, Huntsville, Ala., assignor to John Blue Company, Incorporated, Huntsville, Ala., a corporation of Alabama
Filed May 31, 1960, Ser. No. 32,652
19 Claims. (Cl. 111—7.1)

This invention relates to equipment for applying anhydrous ammonia and other liquid fertilizers to the soil. Such equipment is not new, but thus far has been designed and adapted to apply anhydrous ammonia and other liquid fertilizer to large areas of the soil, i.e., open fields. For that purpose application equipment developed to date has used thin cultivator-like blades which are drawn through the soil, by a tractor or the like, at a depth of the order of 6 inches and have anhydrous ammonia or other liquid fertilizer conducted to the blade tips for escape into the soil. Equipment of that nature is shown, for example, in the patent to Blue et al. No. 2,696,785.

While such equipment is admirably suited for its intended purpose, it is not applicable to certain situations, particularly spot injection or subsoil application of liquid fertilizers. Thus, for example, banana trees do not lend themselves to conventional subsoil fertilization or cultivation by tractor-drawn equipment because of jungle-like growth about the trees and other growing conditions. Even if it were possible to apply anhydrous ammonia or other liquid fertilizer to banana trees by present-day application equipment, the scuffing of the roots of the trees by conventional applicator blades would allow the plant to be attacked by a so-called Panama disease, which usually is fatal. Consequently, banana trees presently are fertilized by scattering urea by hand on the ground about the trees. That method of fertilization has its drawbacks, however, because urea decomposes fairly rapidly in the hot, humid, tropical climate in which banana trees are grown. Hence, about 35 or 40% of the fertilizing effectiveness of the urea is lost in the form of free ammonia which is dissipated in the atmosphere. Additionally, the application of the urea pellets only on the surface of the soil permits weeds and undergrowth, instead of the banana trees, to obtain most of the fertilizing benefit of the urea.

The inherent impracticality and near impossibility of fertilizing banana trees by conventional anhydrous ammonia and other liquid fertilizer application equipment, as outlined above, likewise obtains to the fertilizing of shade trees and shrubbery. Not only do the roots of the latter preclude the dragging of applicator blades through the soil thereadjacent but also shade trees and shrubbery usually are inaccessible to tractor-drawn equipment. Moreover, a tractor, as well as the applicator blades themselves, would damage lawns normally adjacent shade trees and shrubbery. Consequently, shade trees and shrubbery usually are fertilized by boring deep holes around the tree which are partially filled with dry fertilizer. Such an operation not only is slow and laborious, but also relatively expensive.

Accordingly, it is an object of this invention to provide equipment that can be operated by a single person for spot subsoil application of anhydrous ammonia and other liquid fertilizers.

It is another object of this invention to provide a manually-operable implement for spot subsoil application of liquid fertilizers which not only is light in weight but also is uncomplicated and simple and easy to operate by unskilled labor.

It is another object of this invention to provide an implement of the type under consideration which will inject a measured charge of anhydrous ammonia or other liquid fertilizer, and which can be adjusted to vary the amount of such charge.

It is a further object of this invention to provide an implement of the type under consideration that is particularly adapted to apply anhydrous ammonia in exact measured quantities.

Other objects and advantages of the invention will become apparent from the following description and accompanying drawings, in which:

FIGURE 1 is a perspective view of equipment embodying this invention for spot subsoil application of anhydrous ammonia for fertilizing purposes.

FIGURE 2 is an enlarged fragmentary perspective view of the tip of the subsoil blade of the application implement shown in FIGURE 1.

FIGURE 3 is an enlarged fragmentary elevational view of the upper part of the application implement shown in FIGURE 1.

FIGURE 5 is an enlarged fragmentary view of the upper portion of FIGURE 4.

FIGURE 6 is an enlarged fragmentary sectional view taken substantially on line 6—6 of FIGURE 3.

FIGURE 7 is an enlarged fragmentary view of the lower portion of FIGURE 4.

FIGURE 8 is a top view of the implement shown in FIGURE 3.

FIGURE 9 is an enlarged fragmentary sectional view taken substantially on line 9—9 of FIGURE 4.

FIGURE 10 is an enlarged fragmentary sectional view taken substantially on line 10—10 of FIGURE 8.

FIGURE 11 is an enlarged fragmentary sectional view of a portion of FIGURE 4.

Figure 4:
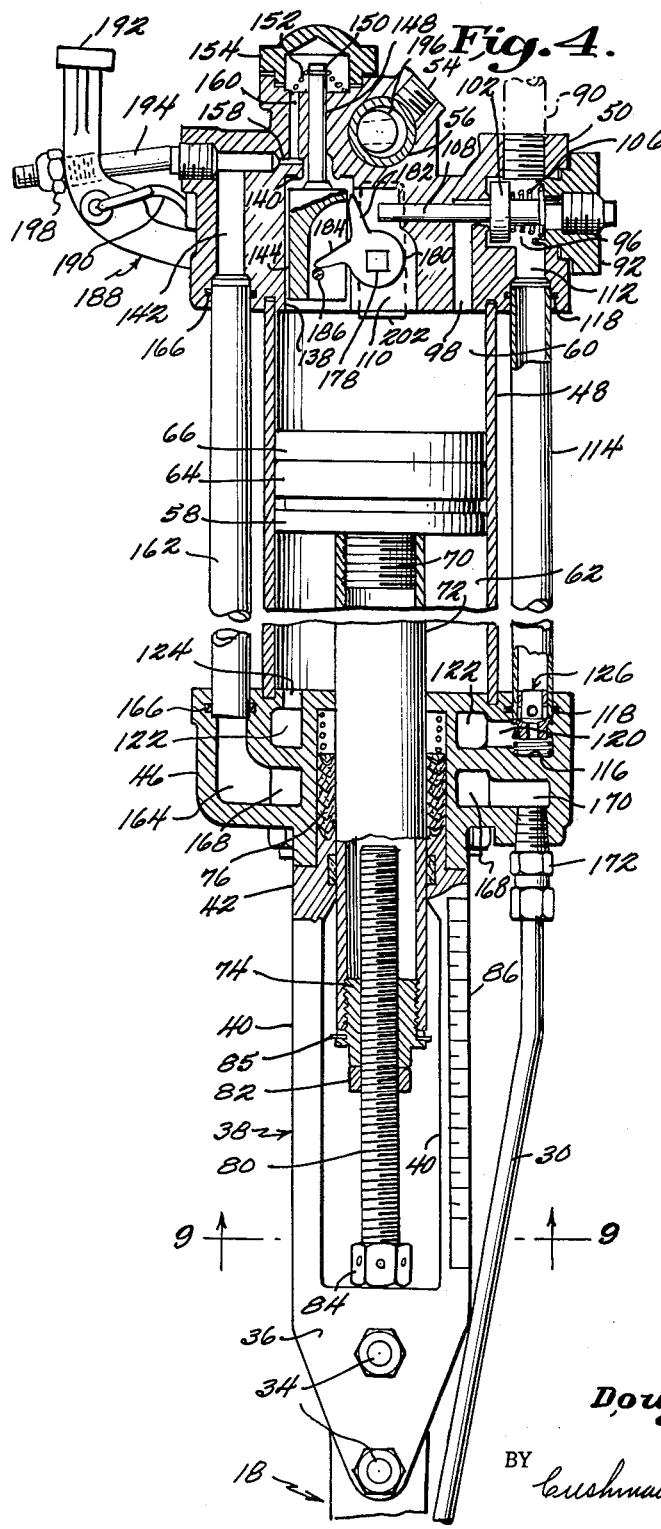
FIGURE 4 is a fragmentary sectional view taken substantially on line 4—4 of FIGURE 3.

Referring now to the drawings, there is shown in FIGURE 1 equipment especially designed for spot subsoil application of anhydrous ammonia for fertilizing purposes. The equipment includes a hand-manipulable implement 10 embodying this invention and a supply tank 12 for anhydrous ammonia which is connected to the implement by a hose 14. The tank 12 of anhydrous ammonia, which may be under a vapor pressure of from about 50 to about 250 p.s.i., depending upon ambient temperature, preferably is mobile, as by being mounted on a hand-drawn wheeled cart 16, as shown, or on a motor vehicle (not shown), such as a truck.

The implement includes a sword-like ground-penetrating blade 18 having a long thin shank 20 and a pointed tip 22. A cross bar 24, adjustably secured to the shank 20 by bolts 26 adapted to extend through selected ones of a series of holes 28 along the shank, serves not only to adjustably limit the depth of penetration of the blade 18 into the soil, but also as a footpiece engageable, when necessary, by an operator's foot, as shown in FIGURE 1, to assist in forcing the blade into the ground. A metal tube 30 extends down an edge of the shank 20 for conducting anhydrous ammonia, as later explained, to escape orifices 32 in the blade tip 22, as shown in FIGURE 2.

The upper end of the blade shank 20 is secured, by bolts 34, in a bifurcated cross-portion 36 on the lower end of an elongated, blade-mounting member 38. The latter has a pair of spaced arms 40 depending from an annular mounting plate 42 secured, as by screws 44, to the under or outer side of a lower cylinder head 46. A cylinder 48 is clamped between the lower cylinder head 46 and an upper cylinder head 50 by elongated tie-bolts 52 which extend through both of such heads. The upper head 50 is provided, in an upper portion thereof, with a transverse bore in which is secured, as by a set screw 54, a tubular rod 56 which projects from opposite sides of the head to form handles which may be grasped by an operator for manipulating the implement 10, as shown in FIGURE 1. If desired, the handles 56 may be provided with rubber hand grips (not shown).

Reciprocable in the cylinder 48 is a piston 58 which divides the former into an upper measuring chamber 60 and a lower power chamber 62, the purposes and functions of which will be later explained. The piston 58 is provided with a conventional cup washer 64 clamped between the upper side of the piston and an annular follower ring 66 which is secured to the piston by cap screws 68, the heads of which preferably are countersunk into the ring, as shown in FIGURE 5. The underside of the piston 58 is provided with an exteriorly threaded boss 70 screwed into the upper end of a tubular piston rod 72 which extends through the lower cylinder head 46 between the arms 40 and has an exteriorly threaded and shouldered nut 74 screwed into the lower end thereof, as shown in FIGURES 4 and 7. The rod 72 is sealed to the lower cylinder head 46 by means of spring-pressed chevron packing 76 disposed within a counterbore in the head which is closed by the annular mounting plate 42. Preferably, the plate 42 is provided with an interior circumferential groove within which is mounted a dust wiper ring 78, of felt or the like, for the piston rod 72.

A long headed screw 80 is threaded into the nut 74, and adjustably secured therein by a lock nut 82. The head 84 of the screw 80 is adapted to engage the crossportion 36 on the lower end of the blade mounting member 38 in order to limit downward movement of the piston rod 72 and, consequently, the filling stroke of the piston 58, as later explained. Adjustment of the screw 80 adjusts the length of the filling stroke in order to vary the quantity of anhydrous ammonia, or other liquid fertilizer, injected on each cycle of operation of the implement 10. Preferably the nut 74 is provided with an elliptically-shaped snap ring 85 fitted in a circumferential groove to serve as a pointer for cooperation with a scale plate 86 secured to one of the arms 40 of the member 38, as by screws 88. The scale 86 may be provided with indicia markings, as shown in FIGURE 3, to indicate the quantity of liquid fertilizer or anhydrous ammonia in each injection charge at any particular adjustment of the screw 80.

The upper side of the upper cylinder head 50 is provided with a tapped inlet opening having an elbow 90 or other suitable fitting threadedly engaged therein to serve as a connection between the supply hose 14 and the implement 10. The inlet opening communicates directly with a lateral recess in the side of the head 50 which is covered by a plug-like closure 92, removably secured to the head by screws, to define a valve chamber 96, as best shown in FIGURE 5. An inlet passage 98 having a ring angle bend therein leads from the chamber 96 to the measuring chamber 60. A beaded valve seat 100 surrounds the entrance to the passage 98 from the chamber 96 and a disk valve member 102, preferably provided with a soft valve washer 104, is urged into seating engagement with the seat 100 by a coil compression spring 106 interposed between the closure 92 and the valve member 102. An operating stem 108 projects from the valve member 102 through a guide bore in the cylinder head 50 into a narrow recess 110 extending upwardly into the cylinder head from the underside thereof.

A passage 112 extends from the valve chamber 96 to the lower side of the upper head 50 and communicates directly with a tube 114 clamped between the two heads 46 and 50. The tube 114 is seated in a counterbore in the passage 112 and in a counterbore in a recess 116 in the lower head 46 (shown best in FIGURE 7), and may be sealed to both heads by O-rings 118 mounted in circumferential grooves in the counterbores. The recess 116 in the lower cylinder head 46 communicates with a lateral port 120 in an annular passageway 122 in the head constituting one pass of a two-pass heat exchanger formed by the head. An opening or port 124 in the upper side of the lower cylinder head 46 provides communication between the passageway 122, on the opposite side thereof from the port 120, and the power chamber 62. A one-way choke valve 126 is associated with the lower end of the tube 114 in order to permit substantially unrestricted flow of liquid into the power chamber 62 but to restrict flow in the opposite direction, i.e., out of the power chamber. Such valve 126, shown best in FIGURE 11, may include a thimble-like sleeve 128 slidably telescoped within the lower end of the tube 114 and having large lateral ports 130 and a closed lower end provided with a flow-restricting orifice 132. An exterior circumferential flange 134 on the sleeve 128 limits movement thereof into the tube 114, while the sleeve is urged into the tube by a coil compression spring 136 engaged between the sleeve flange and the bottom of the recess 116. The lateral ports 130 in the sleeve 128 normally are closed by the inner side wall of the tube 114, but are uncovered when the sleeve moves downwardly under the influence of fluid pressure in the tube, as later explained.

Adjacent the recess 110 in the cylinder head 50, the latter also has a cylindrical recess 138 provided in its upper end or bottom with a bead seat 140 surrounding the entrance of an outlet passage 142. A reciprocable cylindrical valve member 144 disposed in the recess 138 is provided with a resilient washer 146 for engagement with the seat 140, as shown in FIGURE 5. A stem 148 extends from the valve member 144 upwardly through a guide bore in the cylinder head 50 and has a snap ring 150 secured to the upper projecting end thereof. Interposed between such snap ring 150 and a recessed seat in the upper surface of the cylinder head is a coil compression spring 152 which constantly urges the valve member 144 to seat. Preferably, the spring 152, together with the outer end of the valve stem 148, are enclosed by a cap-like member 154 secured, as by screws 156 to the upper cylinder head 50.

The outlet passage 142 extends upwardly, laterally outwardly, and then downwardly to the underside of the cylinder head 50. The lateral portion of the passage 142 is provided with a flow restriction 158 for reasons later explained. Preferably, a drain passage 160 extends from the bottom of the seat for the spring 152 to the passage 142, e.g., to the restriction 158 therein, to permit escape of any liquid leaking along the stem 148 into the space within the member 154. The lower or exit end of the passage 142 is counterbored for the reception of an end of a tube 162 which has its other end seated in a similar counterbore in a passage 164 extending into the lower cylinder head 46. The tube 162 may be sealed to the two cylinder heads 46 and 50, by O-rings 166, in the same manner as the tube 114. The passage 164 communicates with one side of an annular passageway 168, coaxial with and separated by only a thin wall from the annular passageway 122, and constituting a second pass of the aforementioned heat exchanger. A passage 170 extends laterally from the other side of the passageway 122 and then downwardly to terminate in an interiorly threaded portion within which is screwed a fitting 172 connected to the upper end of the injector tube 30.

A valve-operating shaft 174 extends laterally into the upper cylinder head 50 through a suitable packing gland 176 (FIGURE 3) and has a square inner end 178 extending transversely into the recess 110. Secured on the inner end of such shaft 174 within such recess 110 is a lever 180 having a pair of circumferentially-spaced radially extending arms 182 and 184. The arm 182 is adapted to engage the inner end of the valve stem 108, on clockwise movement of the shaft 174, as viewed in FIGURE 5, in order to unseat the valve 102, while the other lever arm 184 extends into a kerf or slot in the side of the valve member 144 and is adapted to engage a pin 186 spanning the sides of such slot to unseat the valve member 144 on counterclockwise movement of the shaft, as shown in FIGURE 5.

An operating lever 188 is secured to the outer end of the shaft 174 and is constantly urged in a clockwise direction, as viewed in FIGURE 5, to unseat the inlet valve 102 and permit the outlet valve 144 to close, by a coil tension spring 190 connected between the lever 188 and the implement handle 56. The lever 188 has a normally-horizontal portion and an upturned end portion terminating in an enlarged flat handle portion 192 adapted to be engaged by the hand of an operator to push the lever downward to rock the shaft 174 counter-clockwise. Counterclockwise movement of the shaft 174, to open the valve 144 and permit the valve 102 to close, preferably is limited by means of a rod 194 which has one end thereof extending through an arcuate slot in the implement handle 56 and threaded into an enlarged rod-like retaining nut 196. The other end of the rod 194 extends through an enlarged opening in the valve operating lever 188 and is provided with an adjusting nut 198.

Extending upwardly into the upper cylinder head 50 from the underside thereof and adjacent the recess 110 is a cylindrical recess 200 within which is mounted a cylindrical plunger-like latch 202 having a transverse circular opening 204 through which extends a portion of the valve shaft 174, as shown in FIGURE 10. Such valve shaft portion is generally cylindrical, except for a flat side 208 thereon, and of slightly smaller diameter than the latch opening 204. A slot 210 extends angularly from a side of the latch opening 204 with one edge of such slot being tangential with the opening 204. The width of such slot 210, however, is slightly less than the diameter of the latch opening 204 so that the other edge of the slot forms a latch surface 212 engageable with the flat surface 208 on the valve shaft 174. The latch 202 is constantly urged downwardly by a coil compression spring 214 interposed between the bottom of the recess 200 and the upper end of the latch. Preferably, a small drain bore 216 extends centrally through the latch 202.

When the latch 202 is pushed upwardly to its full extent, the lower end thereof is substantially flush with the undersurface of the upper cylinder head 50 and the latch opening 204 is substantially coaxial with the shaft 174 so that the latter can rotate freely. When the valve operating handle 192 is pushed downwardly, however, and therefore rocks the shaft 174 in a counterclockwise direction, as viewed in FIGURE 10, it will be seen that the flat 208 on the shaft will be rotated in a position to enable the latch 202 to be moved downwardly under the influence of the spring 214, so that the latch surface 212 will engage the shaft flat 208 and prevent reverse movement, i.e., clockwise rotation, of the shaft. Thus, the valve 144 will be maintained open and the valve 102 closed. In such latched position, the lower end of the latch 202 will project below or beyond the undersurface of the upper cylinder head 50, as shown in FIGURES 5 and 10. The latch 202 will continue to maintain the valves 102 and 144 in their aforedescribed positions until the piston 158 moves upwardly on its discharge or injection stroke and near the end of such stroke engages the lower end of the latch 202 and pushes it upwardly, thus releasing the shaft 174 for rotation, by the spring 190, in a clockwise direction to first permit the valve 144 to close and then to open the valve 102.

*Operation*

Normally the spring 190 retains the lever 188, and consequently the shaft 174 in a position so that the inlet valve 102 is open and the outlet valve 144 closed, therefore permitting anhydrous ammonia to flow under its own pressure from the tank 12 through the hose 14, the valve chamber 96 and passageway 98 into the measuring chamber 60. At the same time, substantial tank pressure of anhydrous ammonia is present in the power chamber 62, because of its constantly open communication with the tank 12 through the port 124, upper pass 122 of the heat exchanger, port 120, orifice 132 of the choke valve 126, tube 114, etc. The area of the piston 58 exposed to pressure in the measuring chamber 60 is greater, however, than the area of the piston exposed to pressure in the power chamber 62 (because such latter area is diminished by the diameter of the piston rod 72). Consequently, because of its essentially differential nature, the piston 58 will move downwardly and effect a filling or refilling stroke, thereby forcing anhydrous ammonia from the power chamber 62 through the upper pass 122 of the heat exchanger, through the throttling orifice 132 of the one-way choke valve 126, up through the tube 114, and through the passageways 112 and 98 into the measuring chamber 60.

With the parts proportioned as shown in the drawings, the ammonia thus displaced from the power chamber 62 on a refilling stroke constitutes approximately 85% of the volume of the measuring chamber 60 at the end of such stroke, so only about 15% of the ammonia flowing into the measuring chamber is supplied directly from the tank 12 on a filling stroke. As described above, the quantity of anhydrous ammonia in the measuring chamber 60 at the end of a filling stroke can be varied by adjustment of the screw 80 to limit the extent of the filling stroke of the piston 58. The one-way choke valve 126 serves to limit the speed of the piston 58 on the filling stroke by restricting flow out of the power chamber 62. Were no means provided for so limiting its speed, the piston 58 might reach an excessive speed during the filling cycle, especially at high supply tank pressures, thus causing the screw head 84 to slam into the cross member 36. Such an impact obviously would cause a shock load to the implement 10. Additionally, high piston speed during a filling stroke would cause excessive flow velocities in the hose 14, tube 114, and passages in the cylinder heads which would increase undesirable gas formation tendencies of the anhydrous ammonia. The restricted orifice 132 in the one-way choke valve 126 is designed to prevent the refill speed of the piston 58 from exceeding three to five times its speed on the discharge or injection stroke. The higher speed of the piston 58 may be permitted on the refill stroke because only slightly more than 15% of the anhydrous ammonia entering the measuring chamber 60 is being drawn through the supply hose 114 and, as later explained, the 85% transferred from the power chamber 62 has been cooled.

With the implement 10 thus normally filled in readiness for an injection cycle, an operator forces the injector blade 18 into the soil, using his foot, if necessary, as aforedescribed, and then merely pushes down on the valve operating handle 192 until the valve shaft 174 becomes locked in a discharge or injection position by the latch 202. On such movement of the handle 192 and shaft 174, the inlet valve 102 first closes and then the outlet valve 144 opens to permit anhydrous ammonia under pressure to flow from the measuring chamber 60, through the flow restriction 158, the tube 162, the lower pass 168 of the heat exchanger, the tube 30, and thence through the injection orifices 32 at the tip 22 of the blade 18 for injection into the soil. It will be seen that the anhydrous ammonia after passing through the restriction 158 will be greatly reduced in pressure because the only pressure downstream of the restriction is the back pressure occasioned by the resistance of the soil to the flow or absorption of anhydrous ammonia thereinto. This back pressure is usually very low depending to some extent, of course, on the density or porosity of the soil. Because of the pressure drop in flowing through the restriction 158, immediately after emission therefrom the anhydrous ammonia will rapidly expand and tend to resume its gaseous state, with a consequent cooling effect on those portions of the cylinder head 50 adjacent the restriction. The anhydrous ammonia continues to expand in its flow away from the restriction 158, thereby passing a cold mixture of gas and liquid through the lower pass 168 of the heat exchanger.

With the inlet valve 102 closed and the outlet valve 144 open so that the pressure of anhydrous ammonia in the measuring chamber 60 is greatly reduced, tank pressure of anhydrous ammonia will still exist in the power chamber 62 to thus move the piston 58 up for an injection stroke forcing all of the anhydrous ammonia out of the measuring chamber. As the piston 58 moves up and anhydrous ammonia flows into the power chamber 62 through the one-way choke valve 126, it will be seen that the orifice 132 in the latter will cause a pressure differential that will be effective to force the sleeve 128 down against the spring 136 and uncover the lateral ports 130. With the ports 130 thus uncovered, there will be substantially no resistance to flow of anhydrous ammonia from the tank 12 into the power chamber 62. It will be seen that anhydrous ammonia thus entering the power chamber 62 will flow through the upper pass 122 of the heat exchanger and thus be cooled because of the good heat exchange relation with the cold mixture flowing through the lower pass 168.

It will be seen that during this injection or discharge stroke of the piston 58, the rate of flow of anhydrous ammonia out of the measuring chamber 60 will be desirably limited because of the flow restriction 158. This limited flow rate, will, in turn, limit the speed of the piston 58 during its discharge stroke and consequently, limit the rate of flow of anhydrous ammonia through the hose 14 and through the passageways in the implement 10 leading to the power chamber 62. Since accurate metering of anhydrous ammonia depends primarily on maintaining the ammonia in a liquid state, the injector is thus designed to limit the flow velocity, and consequent friction loss, of anhydrous ammonia in the feed hose 14 and passageways leading to the power chamber because friction loss and resultant pressure reduction causes the ammonia to tend to flash into gas. Therefore, the flow restriction 158 is small enough to prevent a high discharge rate with a consequent excessive formation of gas, especially in the supply hose 14 which may be 100 feet long or more. The reduced discharge rate also gives the soil more time in which to absorb the liquid-gas mixture being discharged thereinto, without possible loss to the atmosphere.

When the piston 58 reaches the upper end of its discharge stroke, i.e., contacts the underside of the upper cylinder head 50, it will engage the projecting lower end of the latch 202 and move it upwardly against the influence of the spring 214, thus releasing the valve operating shaft 174 for movement, by the spring 190, in a clockwise direction as viewed in FIGURE 5, to thereby open the inlet valve 102 after first permitting the outlet valve 144 to close. Consequently, ammonia will again flow into the measuring chamber 60 in another filling or refilling cycle. Even though it is obvious that during the refill stroke the orifice 132 in the choke valve 126 forms a restriction to the flow of ammonia, with a consequent pressure drop and its accompanying undesirable gas forming tendencies, the temperature of the ammonia flowing into and out of the power chamber 62 has been reduced so much by passage through the heat exchanger, that a small amount of pressure reduction can be tolerated by the orifice 132 without danger of gas formation.

The inclined latch surface 212 has an important function in connection with the unlatching of the valve operating shaft 174 from its discharge position. Because of the torque on the shaft 174 imposed by the spring 190, the latch 202 may present considerable resistance to unlatching movement. By inclining the latch surface 212 at a proper angle, however, the force required to move the latch 202 in an unlatching direction may be reduced to any desired value. A small unlatching force is desirable in order to prevent possible hesitation of the piston 58 during its injection stroke. The upper cylinder head 50, of necessity, contains recesses and passages, such as the recesses 110 and 138, which normally are filled with liquid ammonia. Very little force is needed to move the piston 58 during its injection stroke. Consequently, should the piston 58 encounter considerable resistance in moving the latch 202 adjacent the end of such stroke, the piston would tend to hesitate until the pressure in the measuring chamber 60 was greatly reduced. Such pressure reduction would cause vaporization of the liquid ammonia in the aforementioned recesses and passages in the head 50. Such vaporization might cause the implement 10 to overmeter by a few percent because it will then not only have discharged all of the ammonia in the measuring chamber 60 displaced by the piston 58, but also some of the ammonia contained in the aforementioned recesses and passageways in the head 50. It is for this reason that it is important for the latch 202 to be releasable by the application of a very light force.

The purpose of the stop rod 194 is to prevent damage to the valve mechanism in the event a careless or uninformed operator drives the valve operating handle 192 down with a hard blow. Additionally, should the flow restriction 158 be too large to reduce the injection rate sufficiently to give the soil time to absorb the ammonia without loss, in locations where the soil is extremely compact or hard, further reduction in the discharge rate may be obtained by tightening the nut 198 to thereby limit the lift of, and the flow rate through, the discharge valve 144.

It thus will be seen that the objects of this invention have been fully and effectively accomplished. It will be realized, however, that the specific embodiment described and shown is for the purpose of illustrating the principles of this invention and is subject to modification without departure from the scope of the invention. For example, it is contemplated that the implement can be adapted to inject liquid fertilizers other than anhydrous ammonia, such as nitrogen solutions and complete fertilizer solutions. In order to use the implement for such purpose it is only necessary that the liquid material being injected by the implement be supplied from some pressure source. For example, the liquid may be supplied from a tank which has had air under pressure forced therein so that the liquid may be supplied to the implement under pressure. Additionally, when the implement is used for injection of such liquids, there is no necessity for assuring against such liquid flashing into a gas, and thereby impairing accurate metering. Hence, when the implement is intended to be used for injection of liquid fertilizers other than anhydrous ammonia, the implement may be modified to eliminate the heat exchange passages in the lower cylinder head 46. Retention of the throttling flow restrictions 132 and 158 still will be desirable, however, in order to reduce the refill speed of the piston 58 to prevent the screw head 84 from slamming into the cross member 36 and also to reduce the discharge rate of the implement to a point wherein the piston 58 is in no danger of slamming into the undersurface of the cylinder head 50.

Therefore, this invention includes all modifications which are encompassed within the spirit and scope of the following claims.

I claim:

1. Apparatus for dispensing a measured charge of liquid from a pressurized source thereof to a lower pressure comprising: cylinder means having a liquid inlet passage adapted for connection to a pressurized source of liquid; piston means slidable within said cylinder means and defining therewithin a measuring chamber and a power chamber said power chamber being constructed and arranged for constant communication with said inlet passage to develop a pressure force on said piston means to move the latter in a dispensing direction and diminish the size of said measuring chamber; differential area means associated with said piston means for overcoming said pressure force and for moving said piston means in a filling direction to increase the size of said measuring chamber when the latter is connected to the pressurized source of liquid; discharge conduit means; manually operable valve means mounted to said cylinder means for selectively connecting said measuring chamber with the pressurized source of liquid to be dispensed to fill said measuring chamber or with said discharge conduit means to dispense liquid from said measuring chamber; and means engaged with said valve means for urging the latter into position to connect said measuring chamber with the pressurized source of liquid.

2. Apparatus for dispensing a measured charge of liquid from a pressurized source thereof to a lower pressure comprising: cylinder means having a liquid inlet passage adapted for connection to a pressurized source of liquid; piston means slidable within said cylinder means and defining therewith a measuring chamber and a power chamber said power chamber being constructed and arranged for constant communication with said inlet passage to develop a pressure force on said piston means to move the latter in a dispensing direction and decrease the size of said measuring chambers; differential area means associated with said piston means for overcoming said pressure force and for moving said piston means in a filling direction to increase the size of said measuring chamber when the latter is connected to the pressurized source of liquid; discharge conduit means; manually operable valve means mounted to said cylinder means for selectively connecting said measuring chamber with the pressurized source of liquid to be dispensed to fill said measuring chamber, or with said discharge conduit means to dispense liquid from said measuring chamber; means engaged with and urging said valve means into position to connect said measuring chamber with the pressurized source of liquid; latch means mounted to said cylinder means for retaining said valve means in position to connect said measuring chamber with said discharge conduit means; and means operable by said piston means at the termination of its dispensing movement for operating said latch means to release said valve means for return to the position wherein it connects said measuring chamber with the pressurized source of liquid.

3. Apparatus for dispensing a measured charge of liquid from a pressurized source thereof to a lower pressure comprising: cylinder means having a liquid inlet passage adapted for connection to a pressurized source of liquid; piston means slidable within said cylinder means and defining therewithin a measuring chamber and a power chamber said power chamber being constructed and arranged for constant communication with said inlet passage to develop a pressure force on said piston means to move the latter in a dispensing direction and decrease the size of said measuring chamber; differential area means associated with said piston means for overcoming said pressure force and for moving said piston means in a filling direction to increase the size of said measuring chamber when the later is connected to the pressurized source of liquid; discharge conduit means; manually operable valve means mounted to said cylinder means for selectively connecting said measuring chamber with the pressurized source of liquid to be dispensed to fill said measuring chamber, or with said discharge conduit means to dispense liquid from said measuring chamber; and a one-way choke valve connected to said power chamber for passage of liquid into and out of said chamber through said choke valve, said valve being arranged to restrict passage of liquid out of, and permit free passage of liquid into, said power chamber.

4. Apparatus for dispensing a measured charge of anhydrous ammonia to a pressure not greatly in excess of atmospheric comprising: cylinder means; piston means having a liquid inlet passage adapted for connection to a pressurized source of liquid slidable within said cylinder means and defining therewithin a measuring chamber and a power chamber said power chamber constructed and arranged for constant communication with said inlet passage to develop a pressure force on said piston means to move the latter in a dispensing direction and diminish the size of said measuring chamber; differential area means associated with said piston means for overcoming said pressure force and for moving said piston means in a filling direction to increase the size of said measuring chamber when the later is connected to the pressurized source of liquid; discharge conduit means; manually operable valve means mounted to said cylinder means for selectively connecting said measuring chamber to the source of anhydrous ammonia and to said power chamber or to said discharge conduit means; a heat exchanger; and connections between said heat exchanger and said discharge conduit means and between said heat exchanger and said power chamber for passing the discharge from said measuring chamber in heat exchange relation to the flow into said power chamber, the connection between said measuring chamber and said power chamber, which is selectively effected by said valve means, including said heat exchanger.

5. The structure defined in claim 4 including a flow restriction connected between the measuring chamber and the discharge conduit means.

6. The structure defined in claim 4 including a one-way choke valve connected between the heat exchanger and the source of anhydrous ammonia for restricting the flow out of the power chamber.

7. The structure defined in claim 4 including a flow restriction connected between the measuring chamber and the discharge conduit means, and a one-way choke valve connected between the heat exchanger and the source of anhydrous ammonia for restricting the flow out of the power chamber.

8. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; and manually operable valve means mounted to said implement for selectively connecting said measuring chamber with said discharge conduit means whereby said piston means will effect an injection stroke, or with said inlet whereby said piston means will effect a filling stroke.

9. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet; a piston rod member projecting from said piston means through a wall of said power chamber whereby to make the effective area of said piston means exposed to pressure in said power chamber less than that exposed in said measuring chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; and a stop member mounted to said cylinder means and engageable by said rod member for limiting the filling stroke of said piston means, one of said members having an abutment adjustably mounted thereon for movement toward or away from the other member to thereby vary the length of said filling stroke and consequently the size of the charge.

10. A hand-manipulable implement adapted to be connected to a source of fluid under pressure for injecting a measured charge thereof into the ground comprising: a spike-like ground-penetrating tool; cylinder means mounted to the upper end of said tool in alignment therewith and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; handle bars on said cylinder means for manipulating the implement; and a foot bar on the shank of said tool for forcing the latter into the ground.

11. The structure defined in claim 10 including means mounting the foot bar on the tool shank for adjustment therealong in order to vary the depth to which the tool can be forced into the ground.

12. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; means engaged with and urging said valve means into position to connect said measuring chamber with said inlet; latch means mounted to said implement for retaining said valve means in position for connecting said measuring chamber with said discharge conduit means; and means operable by said piston means at the termination of an injection stroke for operating said latch means to release said valve means for return to said position for connecting said measuring chamber to said inlet.

13. The structure defined in claim 12 including adjustable means associated with the valve means for limiting the flow area thereof between the measuring chamber and the discharge conduit means, and wherein the latch means includes an angled latch surface for retaining said valve means in position to connect said measuring chamber with the inlet in any position of adjustment of said valve means.

14. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; and adjustable means associated with said valve means for limiting the flow area thereof between said measuring chamber and said discharge conduit means.

15. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; and a flow restriction in said discharge conduit means.

16. A hand-manipulable implement adapted to be connected to a source of fluid under pressure for injecting a measured charge thereof into the ground comprising: a spike-like ground-penetrating tool; cylinder means mounted to the upper end of said tool and having an inlet passage adapted to be connected to the source of fluid; differential piston means in said cylinder means and defining therewith a measuring chamber, and a power chamber in constant communication with said inlet, the effective area of said piston means exposed to pressure in said measuring chamber being greater than that exposed in said power chamber; discharge conduit means carried by said tool for conducting fluid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; and one-way choke valve means connected between said power chamber and said inlet for restricting flow of fluid out of said power chamber.

17. A hand-manipulable implement adapted to be connected to a source of anhydrous ammonia under pressure for injecting a measured charge thereof into the ground comprising: a spike-like ground-penetrating tool; cylinder means mounted to the upper end of said tool and having an inlet adapted to be connected to the source of anhydrous ammonia; differential piston means in said cylinder means and defining therewith a measuring chamber and a power chamber in constant communication with said inlet, the effective area of said piston means exposed to pressure in said measuring chamber being greater than that exposed in said power chamber; discharge conduit means carried by said tool for conducting liquid to the lower end of the latter for escape into the soil; manually operable valve means mounted to said implement for selectively connecting said measuring chamber with said discharge conduit means whereby said piston means will effect an injection stroke, or with said inlet whereby said piston means will effect a filling stroke; and a two-pass heat exchanger mounted to the implement, one of the passes of said exchanger being connected into said conduit means and the other pass being connected between said power chamber and said inlet for passing the expanded flow from said measuring chamber in heat exchange relation with the liquid flowing into said power chamber.

18. The structure defined in claim 17 including one-way choke valve means connected between the power chamber and the inlet for restricting the flow out of said power chamber.

19. The structure defined in claim 17 in which the cylinder means has a head and the heat exchanger is formed by two separate passageways extending through said head.

References Cited in the file of this patent

UNITED STATES PATENTS

| | | |
|---|---|---|
| 577,489 | Mills | Feb. 23, 1897 |
| 939,382 | Beard | Nov. 9, 1909 |
| 2,151,057 | Suth | Mar. 21, 1939 |
| 2,622,565 | Venus | Dec. 23, 1952 |
| 2,625,136 | Moog | Jan. 13, 1953 |
| 2,643,866 | Kollsman | June 30, 1953 |
| 2,696,785 | Blue | Dec. 14, 1954 |
| 2,795,899 | Little | June 18, 1957 |
| 2,885,121 | Littleton | May 5, 1959 |
| 2,916,015 | Jeffrey | Dec. 8, 1959 |
| 2,973,728 | Garretson | Mar. 7, 1961 |

FOREIGN PATENTS

| | | |
|---|---|---|
| 13,672 | Australia | Feb. 4, 1909 |
| 1,008,956 | France | Feb. 27, 1952 |